United States Patent
Yeh

(10) Patent No.: US 12,366,963 B2
(45) Date of Patent: Jul. 22, 2025

(54) METHOD FOR STORING DATA AND PARITY DATA IN DIFFERENT CHIP ENABLED REGIONS, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 18 days.

(21) Appl. No.: 18/088,604

(22) Filed: Dec. 25, 2022

(65) Prior Publication Data
US 2024/0168641 A1    May 23, 2024

(30) Foreign Application Priority Data
Nov. 22, 2022   (TW) .................................. 111144536

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)
(58) Field of Classification Search
CPC ..... G06F 3/0613; G06F 3/0659; G06F 3/0679
See application file for complete search history.

(56) References Cited

U.S. PATENT DOCUMENTS

| 11,101,822 B1* | 8/2021 | Chen ..................... H03M 13/05 |
| 2014/0380092 A1 | 12/2014 | Kim et al. |
| 2015/0178149 A1* | 6/2015 | Cai ........................ G06F 11/108 |
| | | 714/766 |

OTHER PUBLICATIONS

"Office Action of Taiwan Counterpart Application", issued on Sep. 7, 2023, p. 1-p. 5.

\* cited by examiner

*Primary Examiner* — Michael Krofcheck
(74) *Attorney, Agent, or Firm* — JCIPRNET

(57) ABSTRACT

A data storage method, a memory storage device, and a memory control circuit unit are provided. The method includes: receiving at least one write command instructing to store target data from a host system; encoding the target data to generate parity data; and respectively storing the target data and the parity data in a first physical management unit and a second physical management unit, and each of the first physical management unit and the second physical management unit crosses multiple chip enabled (CE) regions. In addition, in the first physical management unit, first data is stored in a first chip enabled region among the chip enabled regions. In the second physical management unit, first parity data for protecting the first data is stored in a second chip enabled region among the chip enabled regions, and the first chip enabled region is different from the second chip enabled region.

21 Claims, 8 Drawing Sheets

METHOD FOR STORING DATA AND PARITY DATA IN DIFFERENT CHIP ENABLED REGIONS, MEMORY STORAGE DEVICE AND MEMORY CONTROL CIRCUIT UNIT

CROSS-REFERENCE TO RELATED APPLICATION

This application claims the priority benefit of Taiwan application serial no. 111144536, filed on Nov. 22, 2022. The entirety of the above-mentioned patent application is hereby incorporated by reference herein and made a part of this specification.

BACKGROUND

Technical Field

The disclosure relates to a memory access technology, and in particular to a data storage method, a memory storage device, and a memory control circuit unit.

Description of Related Art

Electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into various portable electronic devices exemplified above.

A rewritable non-volatile memory module may include one or more dies. The die is obtained from a wafer through laser cutting. Each die may be divided into one or more chip enabled (CE) regions. Each chip enabled region may include one or more planes (also referred to as memory planes). Each plane may include multiple physical blocks. Each physical block may include multiple physical pages. Each physical page may include multiple memory cells. The memory cell is the smallest physical element for storing data in the rewritable non-volatile memory module.

Generally speaking, the rewritable non-volatile memory module that supports multi-channel access may access multiple chip enabled regions in parallel through multiple channels to improve data access efficiency. However, common encoding mechanisms of a multi-physical unit (or a cross-physical unit) often store parity data generated via encoding in a specific plane or chip enabled region, thereby causing waste of bandwidth.

SUMMARY

The disclosure provides a data storage method, a memory storage device, and a memory control circuit unit, which can reduce waste of bandwidth in a case where a multi-physical unit (or a cross-physical unit) is adopted for encoding.

An exemplary embodiment of the disclosure provides a data storage method for a rewritable non-volatile memory module. The rewritable non-volatile memory module includes multiple chip enabled regions. The data storage method includes the following steps. At least one write command is received from a host system. The at least one write command instructs to store target data. The target data is encoded to generate parity data. A first write command sequence is sent. The first write command sequence instructs to store the target data in a first physical management unit, and the first physical management unit crosses the chip enabled regions. A second write command sequence is sent. The second write command sequence instructs to store the parity data in a second physical management unit, the second physical management unit crosses the chip enabled regions, and the first physical management unit is different from the second physical management unit. The target data includes first data, the parity data includes first parity data, and the first parity data is used to protect the first data. In the first physical management unit, the first data is stored in a first chip enabled region among the chip enabled regions, in the second physical management unit, the first parity data is stored in a second chip enabled region among the chip enabled regions, and the first chip enabled region and the second chip enabled region belong to different chip enabled regions in the rewritable non-volatile memory module.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple chip enabled regions. The memory control circuit unit is coupled to the connection interface unit and the rewritable non-volatile memory module. The memory control circuit unit is used to perform the following. At least one write command is received from the host system. The at least one write command instructs to store target data. The target data is encoded to generate parity data. A first write command sequence is sent. The first write command sequence instructs to store the target data in a first physical management unit, and the first physical management unit crosses the chip enabled regions. A second write command sequence is sent. The second write command sequence instructs to store the parity data in a second physical management unit, the second physical management unit crosses the chip enabled regions, and the first physical management unit is different from the second physical management unit. The target data includes first data, the parity data includes first parity data, and the first parity data is used to protect the first data. In the first physical management unit, the first data is stored in a first chip enabled region among the chip enabled regions, in the second physical management unit, the first parity data is stored in a second chip enabled region among the chip enabled regions, and the first chip enabled region and the second chip enabled region belong to different chip enabled regions in the rewritable non-volatile memory module.

An exemplary embodiment of the disclosure further provides a memory control circuit unit for controlling a rewritable non-volatile memory module. The rewritable non-volatile memory module includes multiple chip enabled regions. The memory control circuit unit includes a host interface, a memory interface, an error detecting and correcting circuit, and a memory management circuit. The host interface is used to couple to a host system. The memory interface is coupled to the rewritable non-volatile memory module. The memory management circuit is coupled to the host interface, the memory interface, and the error detecting and correcting circuit. The memory management circuit is used to perform the following. At least one write command is received from the host system. The at least one write command instructs to store target data. The error detecting and correcting circuit is instructed to encode target data to generate parity data. A first write command sequence is sent. The first write command sequence instructs to store the target data in a first physical management unit, and the first physical management unit crosses the chip enabled regions. A second write command sequence is sent. The second write command sequence instructs to store the parity data in a second physical management unit, the second physical management unit crosses the chip enabled regions, and the first physical management unit is different from the second physical management unit. The target data includes first data, the parity data includes first parity data, and the first parity data is used to protect the first data. In the first physical management unit, the first data is stored in a first chip enabled region among the chip enabled regions, in the second physical management unit, the first parity data is stored in a second chip enabled region among the chip enabled regions, and the first chip enabled region and the second chip enabled region belong to different chip enabled regions in the rewritable non-volatile memory module.

Based on the above, after receiving the at least one write command from the host system, the data (that is, the target data) instructed to be stored by the write command may be encoded to generate the parity data. Afterwards, the target data and the parity data may be respectively stored in the first physical management unit and the second physical management unit. In particular, the first physical management unit and the second physical management unit both cross the chip enabled regions. In addition, in the first physical management unit, the first data in the target data is stored in the first chip enabled region among the chip enabled regions. In the second physical management unit, the first parity data for protecting the first data is stored in the second chip enabled region among the chip enabled regions, and the first chip enabled region is different from the second chip enabled region. In this way, the waste of bandwidth in the case where the multi-physical unit (or the cross-physical unit) is adopted for encoding can be effectively reduced.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
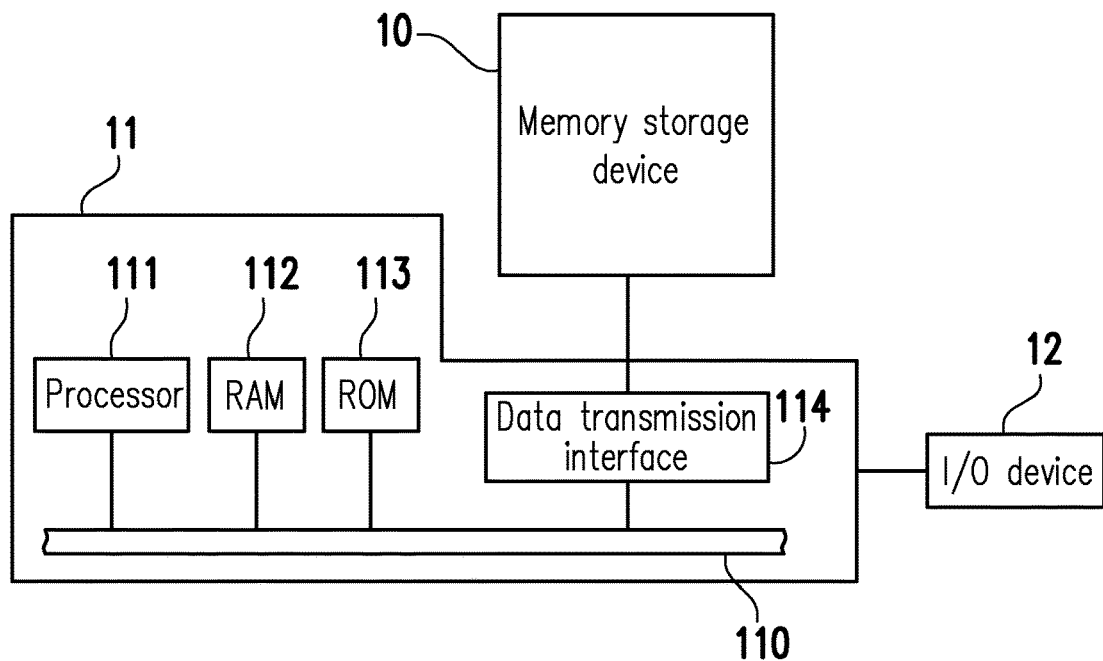
FIG. 1 is a schematic diagram of a host system, a memory storage device, and an input/output (I/O) device according to an exemplary embodiment of the disclosure.
Figure 2:
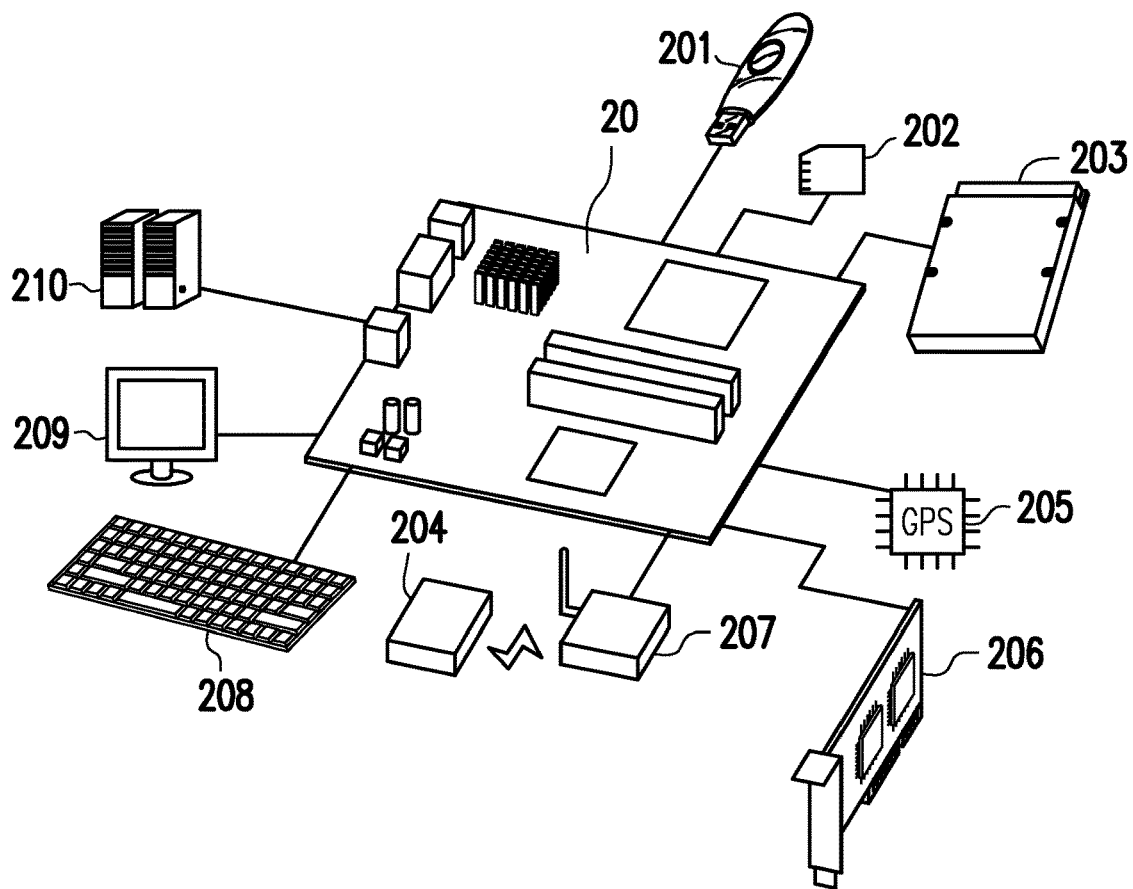
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data in the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
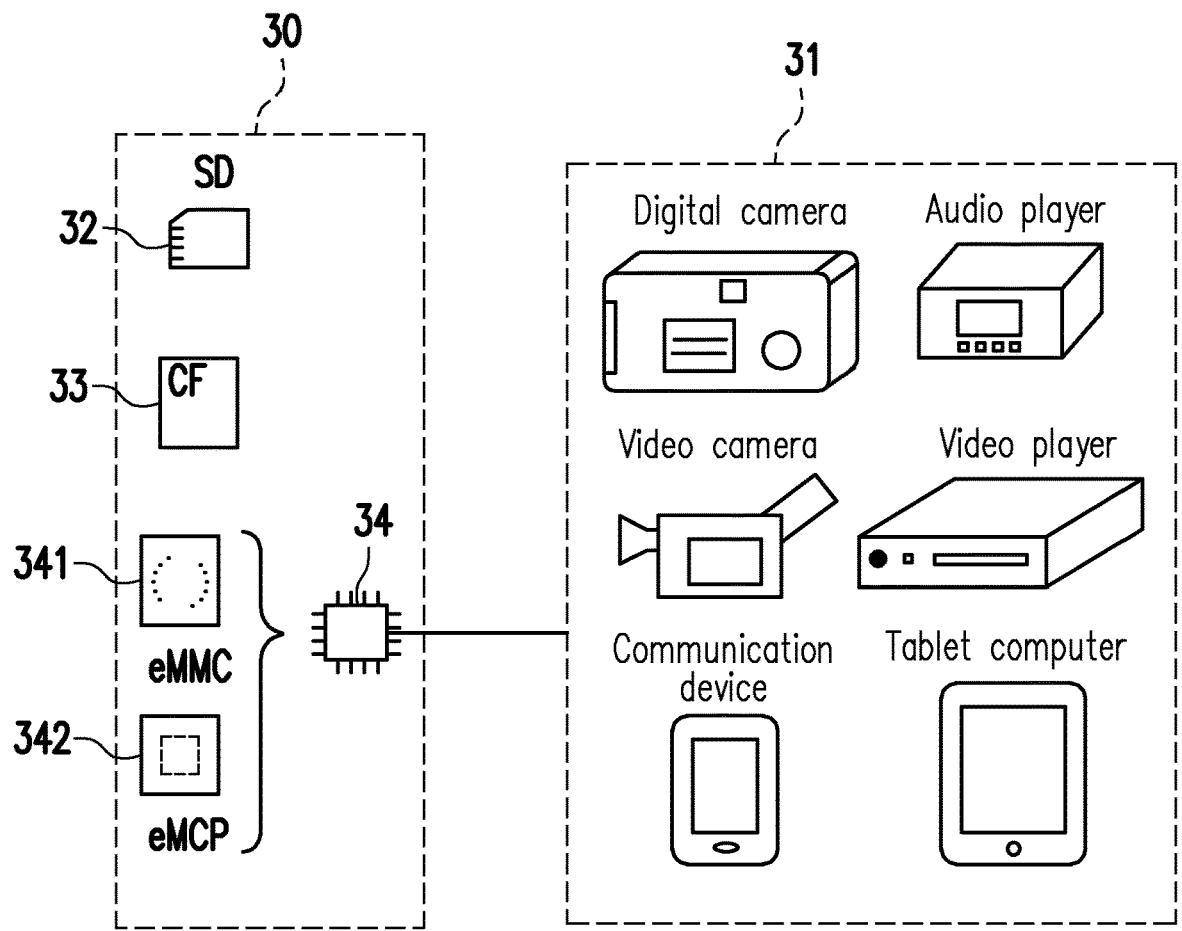
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
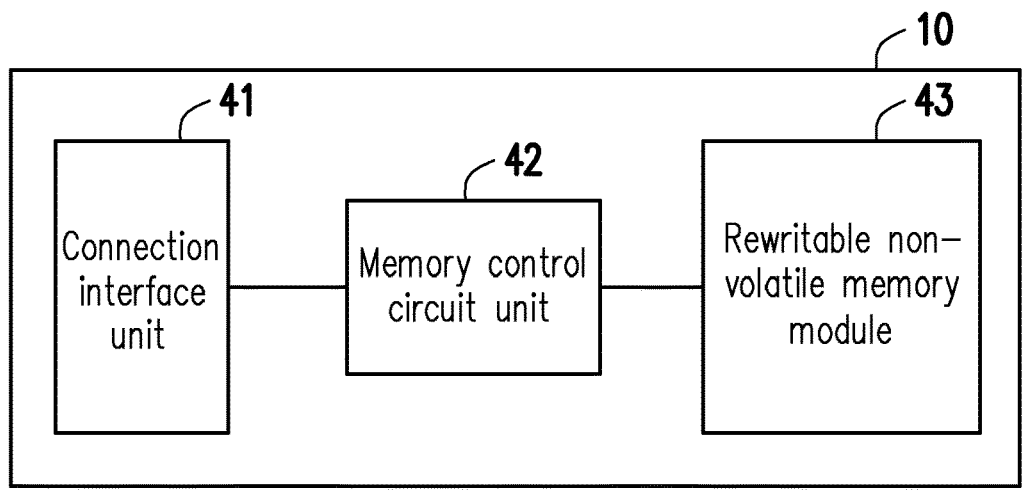
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage states. Through applying a read voltage, it is possible to judge which storage state a memory cell belongs to, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If one memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is used to store system data (for example, management data such as an error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

Figure 5:
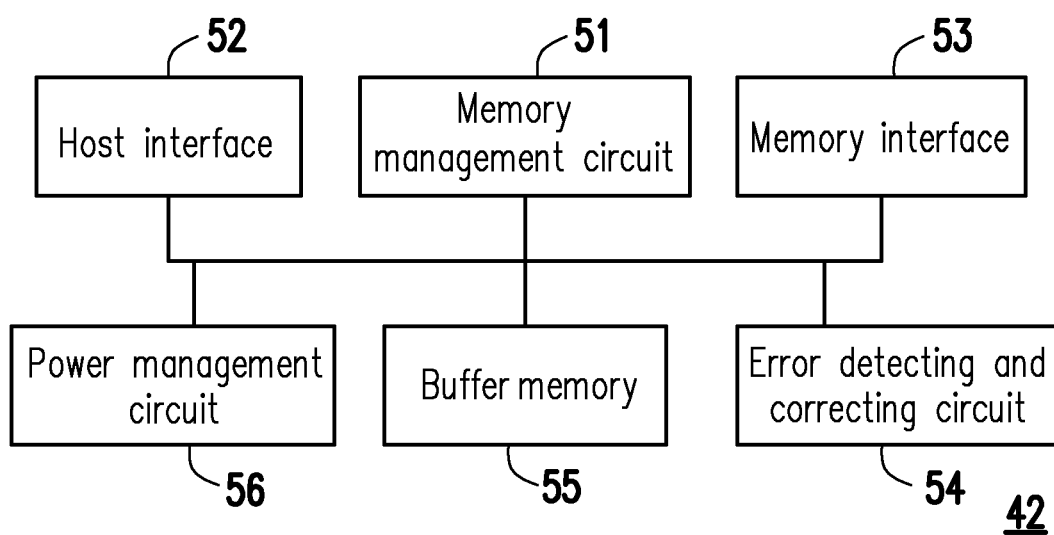
FIG. 5 is a schematic diagram of a memory control circuit unit according to an exemplary embodiment of the disclosure.

FIG. 5 is a schematic diagram of a memory control circuit unit according to an exemplary embodiment of the disclosure.

Please refer to FIG. 5. The memory control circuit unit 42 includes a memory management circuit 51, a host interface 52, and a memory interface 53. The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific region (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 executes the error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
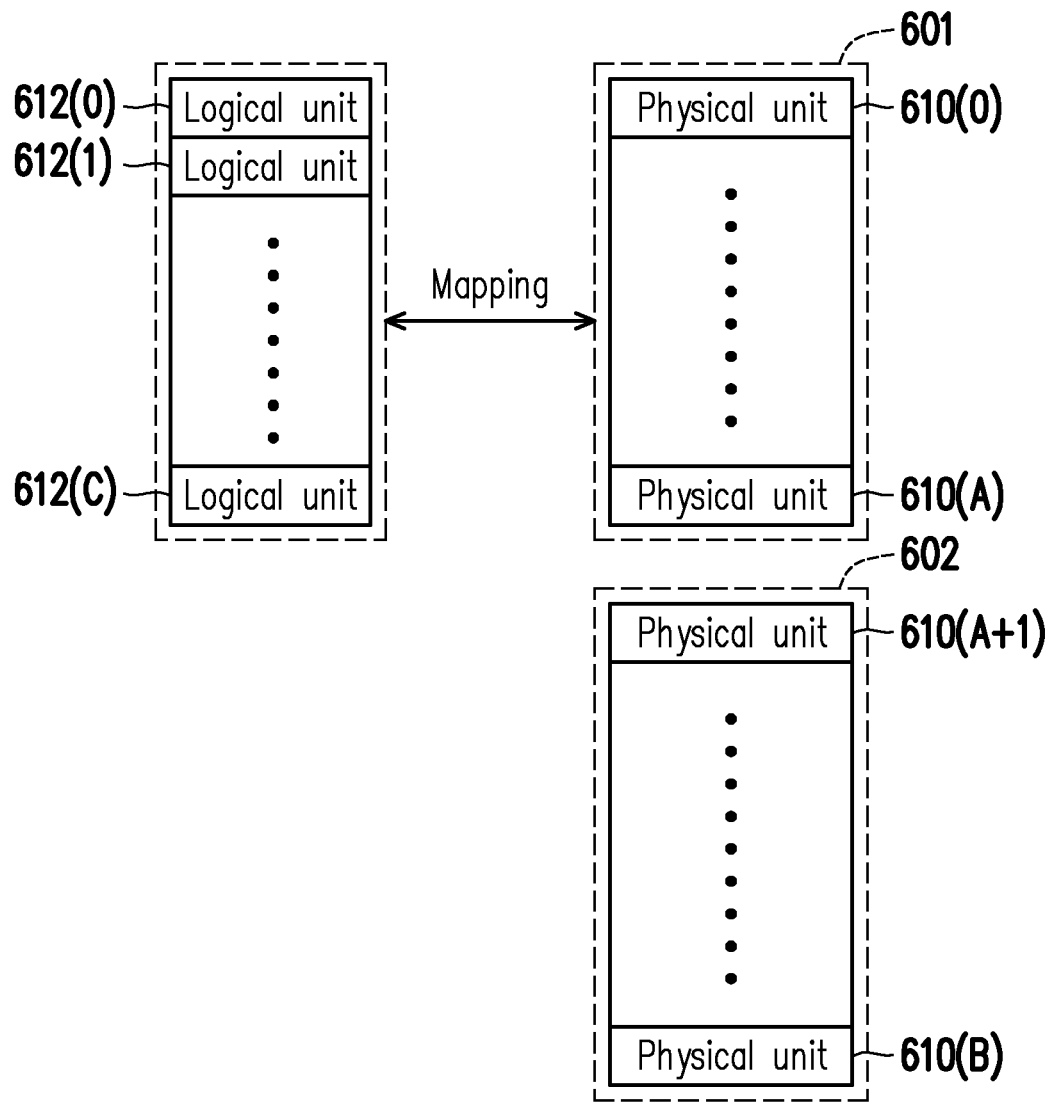
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. The memory management circuit 51 may logically group physical units 610(0) to 610(B) in the rewritable non-volatile memory module 43 into a storage area 601 and a spare area 602. In an exemplary embodiment, a physical unit refers to a physical programing unit. However, in another exemplary embodiment, a physical unit may also include multiple physical programing units.

The physical units 610(0) to 610(A) in the storage area 601 are used to store user data (for example, the user data of the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses. A, B, and C are all positive integers and may be adjusted according to practical requirements, which is not limited in the disclosure.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

Figure 7:
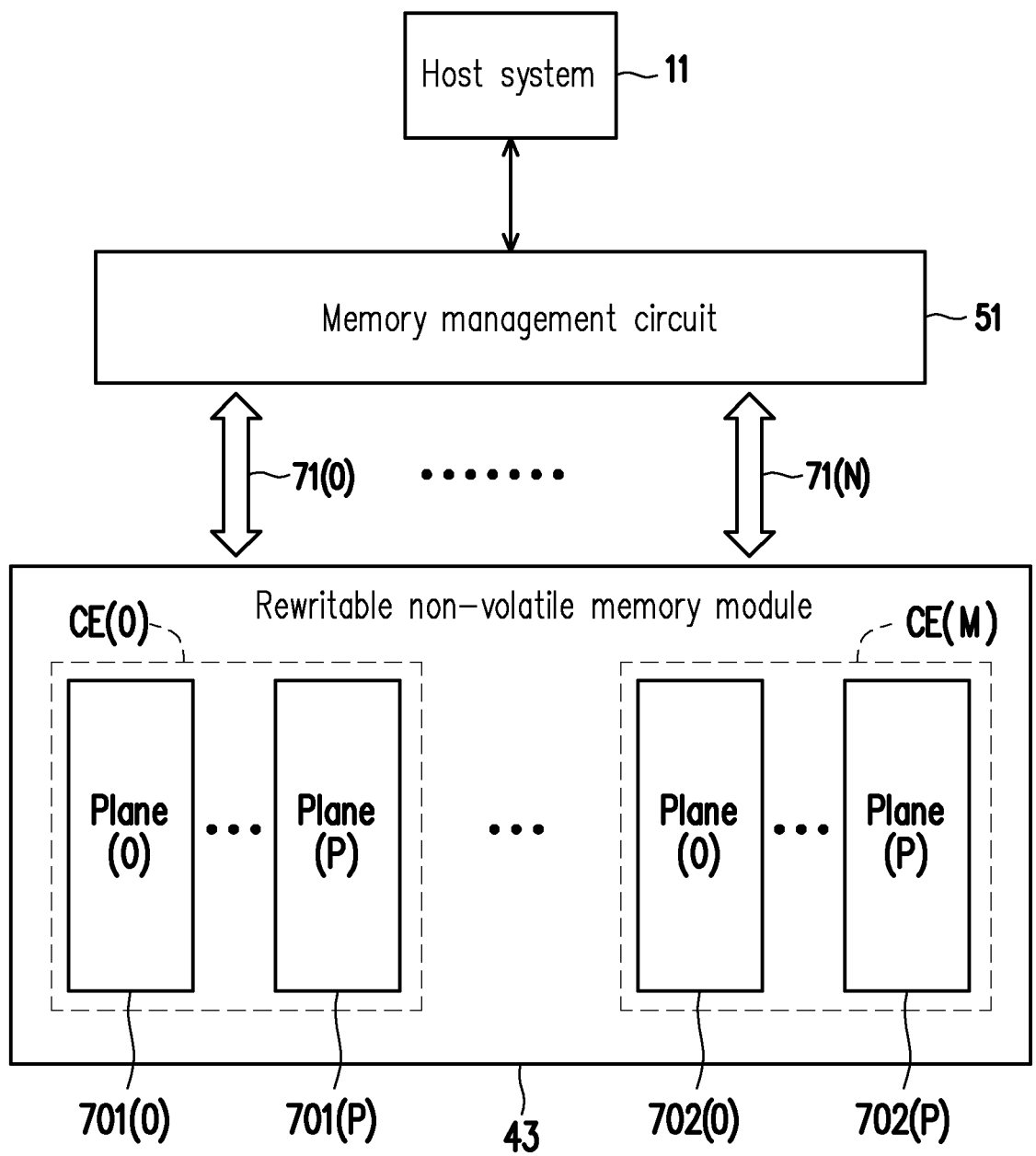
FIG. 7 is a schematic diagram of a system architecture of a memory storage device according to an exemplary embodiment of the disclosure.

FIG. 7 is a schematic diagram of a system architecture of a memory storage device according to an exemplary embodiment of the disclosure.

Please refer to FIG. 7. The rewritable non-volatile memory module 43 may include multiple chip enabled (CE) regions CE(0) to CE(M). For example, the rewritable non-volatile memory module 43 may include one or more dies. The die is obtained from a wafer through laser cutting. Each die may be divided into one or more chip enabled regions. Each of the chip enabled regions CE(0) to CE(M) may include one or more planes (also referred to as memory planes). Each plane may include multiple physical units.

It should be noted that whether a certain chip enabled region may be accessed may be controlled through a chip enabled signal corresponding to the chip enabled region. For example, when the chip enabled signal corresponding to the chip enabled region CE(i) is pulled up, the rewritable non-volatile memory module 43 may read data from the chip enabled region CE(i) or store data in the chip enabled region CE(i). However, if the chip enabled signal corresponding to the chip enabled region CE(i) is not pulled up, the rewritable non-volatile memory module 43 cannot read the data from the chip enabled region CE(i) or store the data in the chip enabled region CE(i).

It should be noted that in the exemplary embodiment, each of the chip enabled regions CE(0) to CE(M) including the same number of planes (marked as a plane (0) to a plane (P)) is taken as an example. For example, the chip enabled region CE(0) includes planes 701(0) to 701(P), the chip enabled region CE(M) includes planes 702(0) to 702(P), and so on. However, the total number of planes (that is, P) in different chip enabled regions may also be different, which is not limited in the disclosure.

The memory management circuit 51 may access the rewritable non-volatile memory module 43 via channels (also referred to as memory channels) 71(0) to 71(N). In particular, each of the channels 71(0) to 71(N) may be used to access one or more specific chip enabled regions. For example, the channel 71(0) may be used to access the chip enabled region CE(0) (and the planes 701(0) to 701(P)), the channel 71(N) may be used to access the chip enabled region CE(M) (and the planes 702(0) to 702(P)), and so on, and N may be the same as or different from M. In addition, N, M, and P are all positive integers and may be adjusted according to practical requirements, which is not limited in the disclosure.

In an exemplary embodiment, the memory management circuit 51 may receive at least one write command from the host system 11. The write command instructs to store specific data (also referred to as target data). According to the write command, the memory management circuit 51 may instruct the error detecting and correcting circuit 54 to encode the target data to generate parity data corresponding to the target data. The parity data may be used to protect the target data. For example, when reading the target data from the rewritable non-volatile memory module 43, the parity data may be read together. The error detecting and correcting circuit 54 may decode the target data according to the parity data to correct errors in the target data.

It should be noted that the encoding of the target data by the error detecting and correcting circuit 54 refers to encoding of a multi-physical unit performed on the target data by the error detecting and correcting circuit 54. In an exemplary embodiment, the encoding of the multi-physical unit is also referred to as encoding of a cross-physical unit. For example, assuming that data in the target data may be continuously stored in multiple physical units, the error detecting and correcting circuit 54 may execute the encoding of the multi-physical unit on the data to generate the parity data. Then, when at least part of the data in the target data is read from the rewritable non-volatile memory module 43, if an error in the data read from a specific physical unit cannot be corrected based on an error correcting code and/or an error detecting code in the single physical unit, the memory management circuit 51 may further read the parity data from the rewritable non-volatile memory module 43. Then, the error detecting and correcting circuit 54 may perform decoding of the multi-physical unit on the target data according to the parity data to try to correct the error through an encoding protection mechanism between the physical units. In an exemplary embodiment, the decoding of the multi-physical unit is also referred to as decoding of a cross-physical unit.

Figure 8:
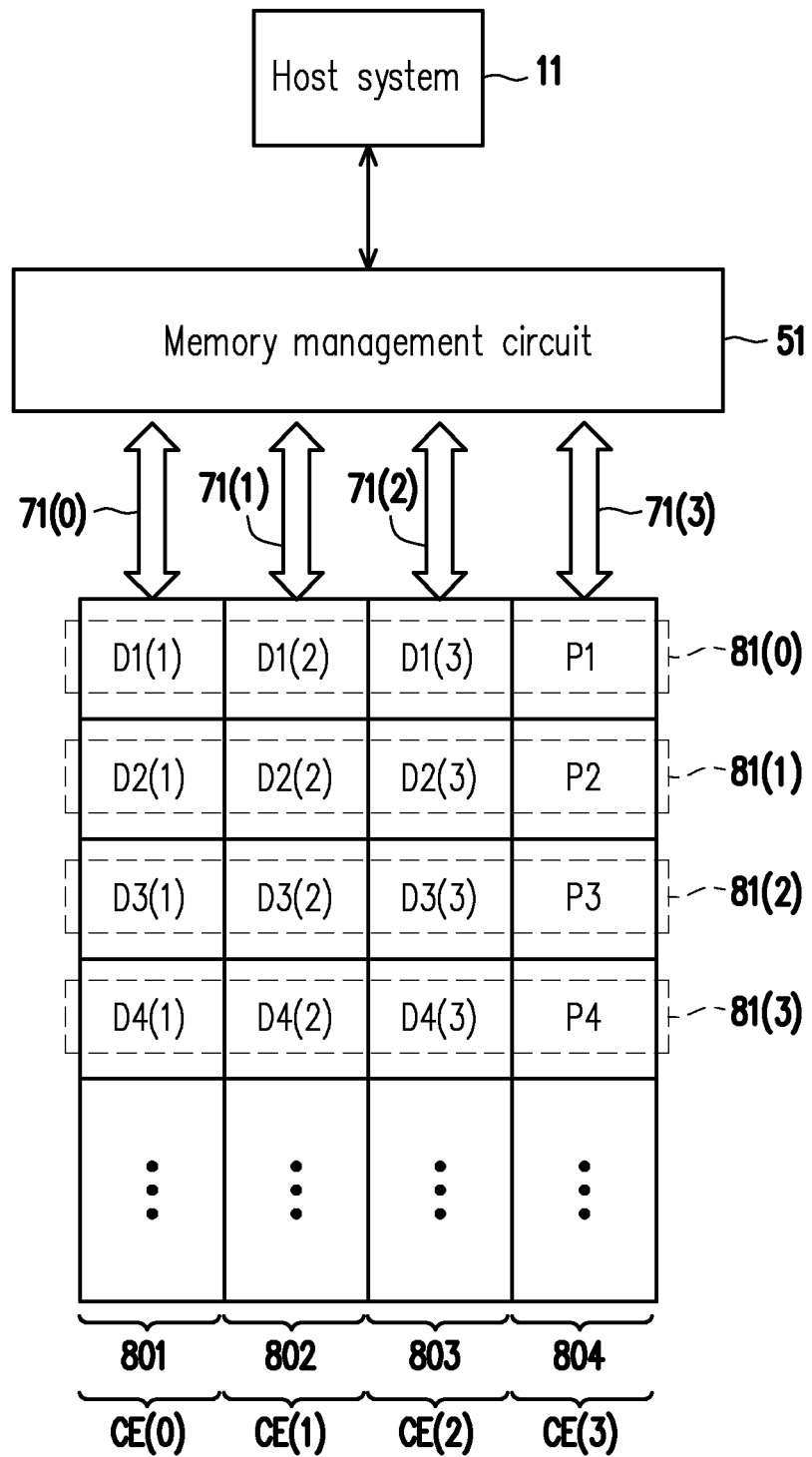
FIG. 8 is a schematic diagram of storing corresponding parity data of target data according to an exemplary embodiment of the disclosure.

FIG. 8 is a schematic diagram of storing corresponding parity data of target data according to an exemplary embodiment of the disclosure.

Please refer to FIG. 7 and FIG. 8. Assuming that the chip enabled regions CE(0) to CE(3) respectively include planes 801 to 804, and the memory management circuit 51 may respectively access the planes 801 to 804 through the channels 71(0) to 71(3). The memory management circuit 51 may receive the at least one write command from the host system 11. The write command instructs to store the target data. For example, the target data includes data D1(1) to D1(3), D2(1) to D2(3), D3(1) to D3(3), and D4(1) to D4(3).

According to the write command, the error detecting and correcting circuit 54 may encode (that is, the encoding of the multi-physical unit) the data D1(1) to D1(3) to generate parity data P1. The parity data P1 may be used to protect the data D1(1) to D1(3). For example, when reading the data, the error detecting and correcting circuit 54 may decode (that is, the decoding of the multi-physical unit) the data D1(1) to D1(3) according to the parity data P1 to detect and/or correct errors in the data D1(1) to D1(3). Similarly, the error detecting and correcting circuit 54 may encode (that is, the encoding of the multi-physical unit) the data D2(1) to D2(3) to generate parity data P2, encode (that is, the encoding of the multi-physical unit) the data D3(1) to D3(3) to generate parity data P3, and encode (that is, the encoding of the multi-physical unit) the data D4(1) to D4(3) to generate parity data P4. The parity data P2 may be used to protect the data D2(1) to D2(3). The parity data P3 may be used to protect the data D3(1) to D3(3). The parity data P4 may be used to protect the data D4(1) to D4(3).

It should be noted that in the exemplary embodiment of FIG. 8, a common data storage mechanism is taken as an example for illustration. That is, in the common data storage mechanism, the memory management circuit 51 may send a write command sequence to the rewritable non-volatile memory module 43 to instruct the rewritable non-volatile memory module 43 to store the data D1(1) to D1(3) and the parity data P1 in a physical management unit 81(0), store the data D2(1) to D2(3) and the parity data P2 in a physical management unit 81(1), store the data D3(1) to D3(3) and the parity data P3 in a physical management unit 81(2), and store the data D4(1) to D4(3) and the parity data P4 in a physical management unit 81(3) through the channels 71(0) to 71(3). Thus, in the physical management units 81(0) to 81(3), the data D1(1), D2(1), D3(1), and D4(1) are stored in the plane 801, the data D1(2), D2(2), D3(2), and D4(2) are stored in the plane 802, the data D1(3), D2(3), D3(3), and D4(3) are stored in the plane 803, and the parity data P1 to P4 are stored in the plane 804, as shown in FIG. 8.

Afterwards, when the target data is to be read, the memory management circuit 51 reads the target data (that is, the data D1(1) to D1(3), D2(1) to D2(3), D3(1) to D3(3), and D4(1) to D4(3)) from the rewritable non-volatile memory module 43 only through the channels 71(0) to 71(2), and the channel 71(3) cannot be used to read the target data. Therefore, for the host system 11, although the rewritable non-volatile memory module 43 supports a bandwidth of up to 4 channels, during actual operation, the rewritable non-volatile memory module 43 can only use a bandwidth of up to 3 channels to read the target data. Similar waste of bandwidth may also occur at the stage of writing data. That is, when storing the target data, the memory management circuit 51 stores the target data in the rewritable non-volatile memory module 43 only through the channels 71(0) to 71(2), thereby causing waste of bandwidth (that is, waste of ¼ of bandwidth). In an exemplary embodiment, the memory management circuit 51 may change a distribution of the target data and the corresponding parity data in the planes 801 to 804 (or the chip enabled regions CE(0) to CE(3)), so as to improve channel utilization rate during a period of writing data or reading data.

In an exemplary embodiment, the memory management circuit 51 may send a write command sequence (also referred to as a first write command sequence) to the rewritable non-volatile memory module 43. The first write command sequence may instruct the rewritable non-volatile memory module 43 to store the target data in one or more physical management units (also referred to as a first physical management unit) in the rewritable non-volatile memory module 43. In particular, the first physical management unit crosses multiple chip enabled regions in the rewritable non-volatile memory module 43.

On the other hand, the memory management circuit 51 may send another write command sequence (also referred to as a second write command sequence) to the rewritable non-volatile memory module 43. The second write command sequence may instruct the rewritable non-volatile memory module 43 to store the parity data corresponding to the target data to another physical management unit (also referred to as a second physical management unit) in the rewritable non-volatile memory module 43. Similar to the first physical management unit, the second physical management unit also crosses the chip enabled regions.

In the following, for the convenience of description, a part of the target data is referred to as first data, a part of the parity data is referred to as first parity data, and the first parity data is used to protect the first data. For example, the error detecting and correcting circuit 54 may perform the encoding of the multi-physical unit on the first data to generate the first parity data. It should be noted that in the first physical management unit, the first data is stored in a part of the chip enabled regions (also referred to as a first chip enabled region). In addition, in the second physical management unit, the first parity data is stored in another chip enabled region (also referred to as a second chip enabled region) among the chip enabled regions. In particular, the first chip enabled region and the second chip enabled region belong to different chip enabled regions in the rewritable non-volatile memory module 43.

Figure 9:
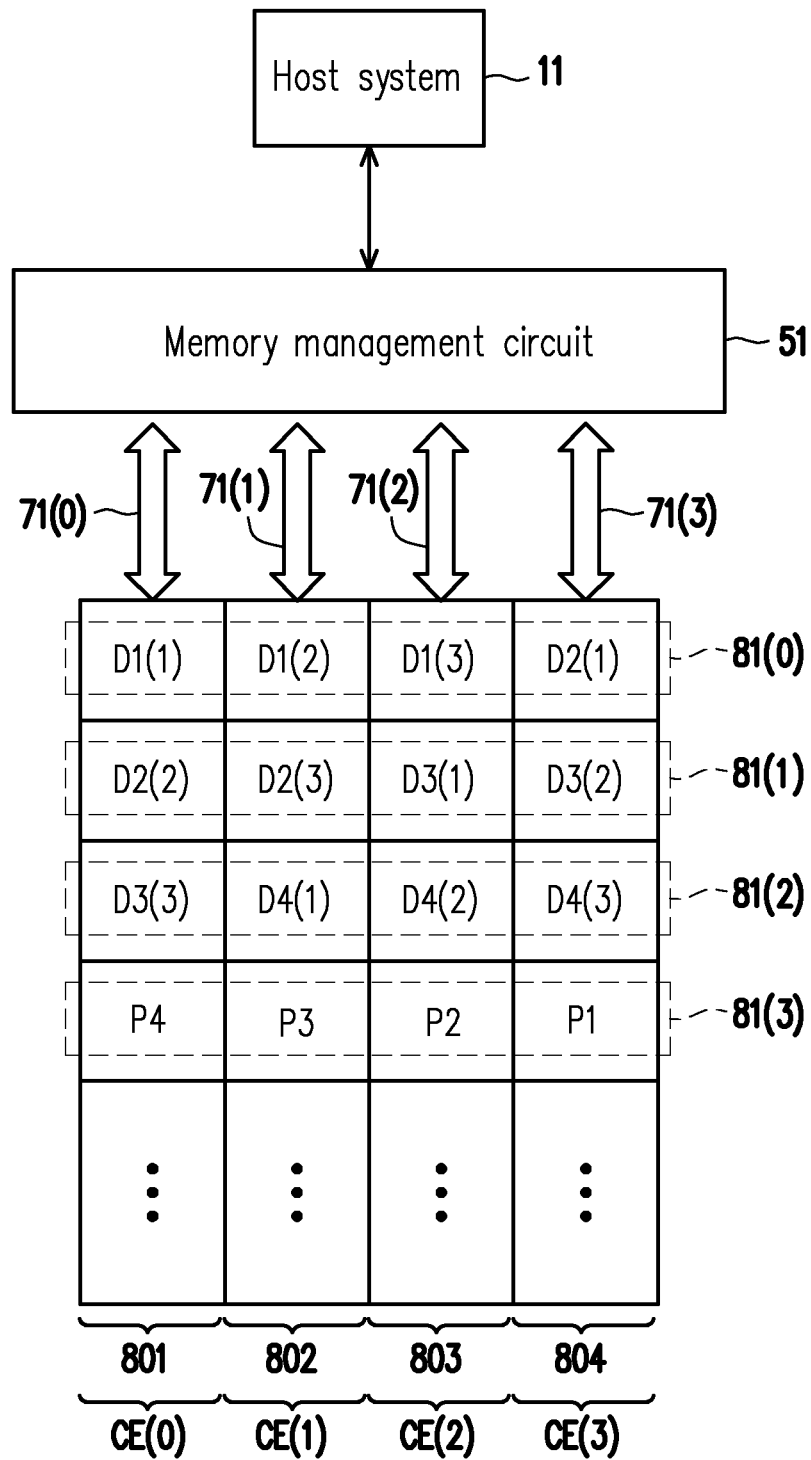
FIG. 9 is a schematic diagram of storing corresponding parity data of target data according to an exemplary embodiment of the disclosure.

FIG. 9 is a schematic diagram of storing corresponding parity data of target data according to an exemplary embodiment of the disclosure.

Please refer to FIG. 9. Compared to the exemplary embodiment of FIG. 8, in the exemplary embodiment of FIG. 9, when storing the target data, in the physical management unit 81(0), the data D1(1) to D1(3) and D2(1) may be respectively stored in the planes 801 to 804; in the physical management unit 81(1), the data D2(2), D2(3), D3(1), and D3(2) may be respectively stored in the planes 801 to 804; and in the physical management unit 81(2), the data D3(3), D4(1), D4(2), and D4(3) may be respectively stored in the planes 801 to 804. In addition, in the physical management unit 81(3), the parity data P1 to P4 may be dispersedly stored in the planes 801 to 804. The specific distribution of storage locations of data is shown in FIG. 9, but the disclosure is not limited thereto.

It should be noted that in the exemplary embodiment of FIG. 9, whether the data D1(1) to D1(3), D2(1) to D2(3), D3(1) to D3(3), or D4(1) to D4(3) are regarded as the first data, the storage manners of the first data and the first parity data all satisfy the above limitation, that is, the chip enabled region (that is, the first chip enabled region) for storing the first data in the first physical management unit is different from the chip enabled region (that is, the second chip enabled region) for storing the first parity data in the second physical management unit. For example, assuming that the first data includes the data D1(1) to D1(3), the first physical management unit may include the physical management unit 81(0), and the second physical management unit may include the physical management unit 81(3). In the physical management unit 81(0), the data D1(1) to D1(3) are respectively stored in the planes 801 to 803, and in the physical management unit 81(3), the parity data P1 is stored in the plane 804. Alternatively, assuming that the first data includes the data D2(1) to D2(3), the first physical management unit may include the physical management units 81(0) and 81(1), and the second physical management unit may include the physical management unit 81(3). In the physical management units 81(0) and 81(1), the data D2(1) to D2(3) are respectively stored in the planes 804, 801, and 802, and in the physical management unit 81(3), the parity data P2 is stored in the plane 803.

In other words, in the exemplary embodiment of FIG. 9, when writing and reading the target data, the bandwidth of the 4 channels 71(0) to 71(3) may be completely used. In addition, when the first data and the first parity data corresponding to the first data need to be read to decode the first data, the bandwidth of the 4 channels 71(0) to 71(3) may also be completely used. Taking the data D1(1) to D1(3) as an example, the data D1(1) to D1(3) and the parity data P1 may be respectively read through the channels 71(0) to 71(3). Alternatively, taking the data D2(1) to D2(3) as an example, the data D2(1) to D2(3) and the parity data P2 may also be respectively read through the channels 71(0) to 71(3). In this way, the channel utilization rate can be effectively improved and/or the waste of bandwidth in a case where the multi-physical unit (or the cross-physical unit) is adopted for encoding can be effectively reduced.

In an exemplary embodiment, another part of the target data is also referred to as second data, another part of the parity data is also referred to as second parity data, and the second parity data is used to protect the second data. For example, the error detecting and correcting circuit 54 may perform the encoding of the multi-physical unit on the second data to generate the second parity data.

It should be noted that in the first physical management unit, at least part of the second data is stored in the second chip enabled region. In addition, in the second physical management unit, the second parity data is stored in the first chip enabled region. Taking FIG. 9 as an example, assuming that the first data includes the data D1(1) to D1(3) and the second data includes the data D2(1) to D2(3), the storage locations of the data D1(1) to D1(3), the data D2(1) to D2(3), the parity data P1, and the parity data P2 may meet the above limitation. Alternatively, assuming that the first data includes the data D2(1) to D2(3) and the second data includes the data D3(1) to D3(3), the storage locations of the data D2(1) to D2(3), the data D3(1) to D3(3), the parity data P2, and the parity data P3 may also meet the above limitation.

In an exemplary embodiment, in the second physical management unit, the parity data for protecting different data may be dispersedly stored in multiple chip enabled regions. Taking FIG. 9 as an example, the parity data P1 to P4 are forced to be dispersedly stored in the planes 801 to 804 (or the chip enabled regions CE(0) to CE(3)), and the planes 801 to 804 (or the chip enabled regions CE (0) to CE(3)) respectively correspond to the channels 71(0) to 71(3). Through dispersedly storing the parity data P1 to P4 in the planes 801 to 804 (or the chip enabled regions CE(0) to CE(3)), it is possible to improve the issue of the waste of bandwidth that is conventionally encountered by centrally storing the parity data P1 to P4 in the chip enabled region (for example, the chip enabled region CE(3) of FIG. 8) corresponding to a single channel.

It should be noted that the distribution of the storage locations of the target data and the parity data in FIG. 9 is only an example. In another exemplary embodiment, the distribution of the storage locations of the target data and the parity data may be adjusted according to practical requirements, as long as the above relevant description and/or limitation are met.

Figure 10:
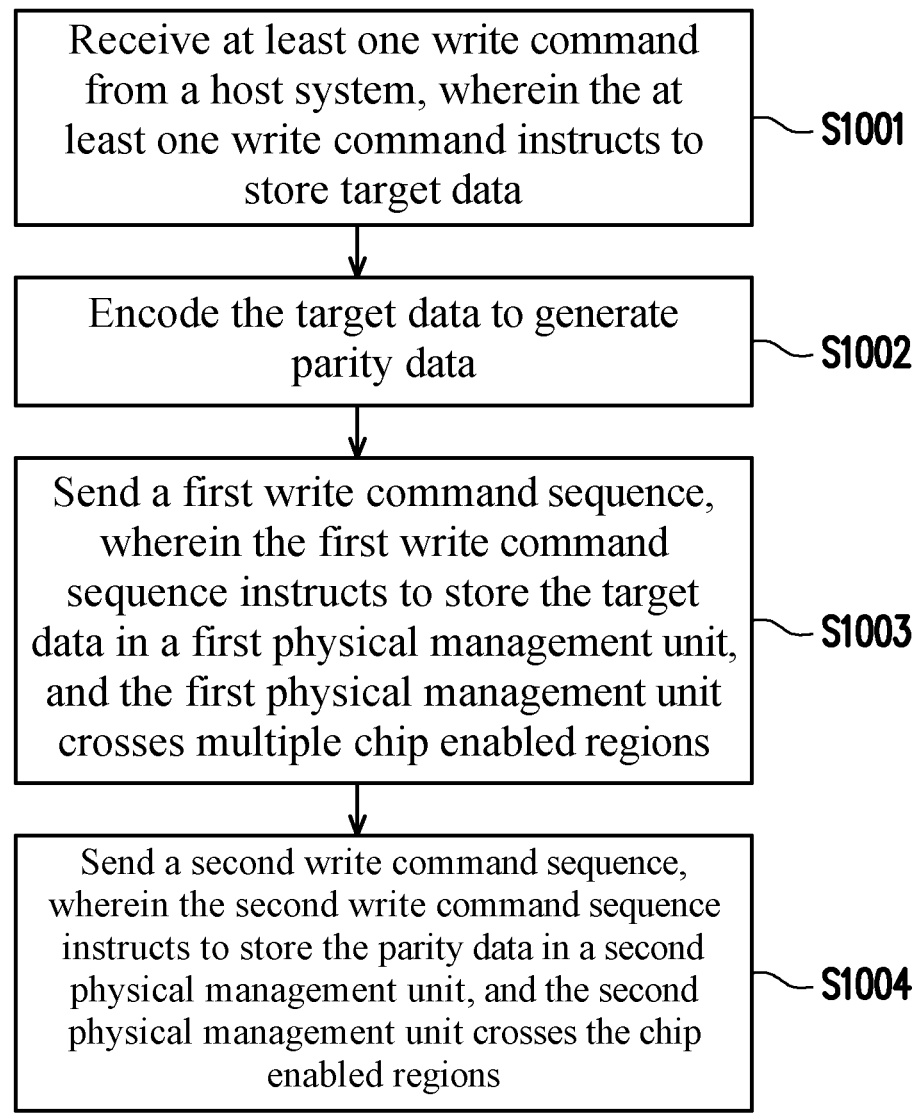
FIG. 10 is a flowchart of a data storage method according to an exemplary embodiment of the disclosure.

FIG. 10 is a flowchart of a data storage method according to an exemplary embodiment of the disclosure.

Please refer to FIG. 10. In Step S1001, at least one write command is received from a host system, wherein the at least one write command instructs to store target data. In Step S1002, the target data is encoded to generate parity data. In Step S1003, a first write command sequence is sent, wherein the first write command sequence instructs to store the target data in a first physical management unit, and the first physical management unit crosses multiple chip enabled regions. In Step S1004, a second write command sequence is sent, wherein the second write command sequence instructs to store the parity data in a second physical management unit, the second physical management unit also crosses the chip enabled regions, and the first physical management unit is different from the second physical management unit.

In particular, it is assumed that the target data includes first data, the parity data includes first parity data, and the first parity data is used to protect the first data. In the first physical management unit, the first data is stored in multiple first chip enabled regions among the chip enabled regions. The total number of the first chip enabled region may be one or more. In addition, in the second physical management unit, the first parity data is stored in a second chip enabled region among the chip enabled regions. The total number of the second chip enabled region may also be one or more. The first chip enabled regions and the second chip enabled region belong to different chip enabled regions in the rewritable non-volatile memory module.

However, each step in FIG. 10 has been described in detail above and will not be repeated here. It should be noted that each step in FIG. 10 may be implemented as multiple program codes or circuits, which is not limited in the disclosure. In addition, the method of FIG. 10 may be used in conjunction with the above exemplary embodiments or may be used alone, which is not limited in the disclosure.

In summary, in the data storage method, the memory storage device, and the memory control circuit unit according to the exemplary embodiments of the disclosure, the data and the parity data may be respectively stored in different physical management units, and each physical management unit crosses multiple chip enabled regions. In addition, multiple parity data for protecting different data may be forced to be dispersedly stored in the chip enabled regions corresponding to different channels. In this way, the channel utilization rate can be effectively improved and/or the waste of bandwidth in the case where the multi-physical unit (or the cross-physical unit) is adopted for encoding can be effectively reduced.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A data storage method for a rewritable non-volatile memory module, wherein the rewritable non-volatile memory module comprises a plurality of chip enabled regions, the data storage method comprising:
   receiving at least one write command from a host system, wherein the at least one write command instructs to store target data;
   encoding the target data to generate parity data;
   sending a first write command sequence, wherein the first write command sequence instructs to store the target data in a first physical management unit, and the first physical management unit crosses the chip enabled regions; and
   sending a second write command sequence, wherein the second write command sequence instructs to store the parity data in a second physical management unit, the second physical management unit crosses the chip enabled regions, and the first physical management unit is different from the second physical management unit, wherein
   the target data comprises first data, the parity data comprises first parity data, and the first parity data is used to protect the first data,
   the first parity data is generated based on encoding of the first data sequentially stored in a default number of the chip enabled regions, the first data and the first parity data can fulfill one physical management unit crossing the chip enabled regions,
   the first physical management unit storing the first data in a plurality of first chip enabled regions among the chip enabled regions, and the second physical management unit storing the first parity data in a second chip enabled region among the chip enabled regions different from the first chip enabled regions do not belong to any of one single physical management unit, continuous physical management units, and neighboring physical management units.

2. The data storage method according to claim 1, wherein the step of encoding the target data to generate the parity data comprises:
   encoding the first data to generate the first parity data.

3. The data storage method according to claim 1, wherein the target data further comprises second data, the parity data further comprises second parity data, and the second parity data is used to protect the second data,
   in the first physical management unit, at least part of the second data is stored in the second chip enabled region, and
   in the second physical management unit, the second parity data is stored in the first chip enabled region.

4. The data storage method according to claim 3, wherein the step of encoding the target data to generate the parity data comprises:
   encoding the first data to generate the first parity data; and
   encoding the second data to generate the second parity data.

5. The data storage method according to claim 1, wherein in the second physical management unit, parity data for protecting different data is dispersedly stored in the chip enabled regions.

6. The data storage method according to claim 1, further comprising:
   respectively accessing the chip enabled regions via a plurality of channels.

7. The data storage method according to claim 6, wherein in the second physical management unit, parity data for protecting different data is dispersedly stored in a plurality of chip enabled regions respectively corresponding to different channels.

8. A memory storage device, comprising:
   a connection interface unit, used to couple to a host system;
   a rewritable non-volatile memory module, comprising a plurality of chip enabled regions; and
   a memory control circuit unit, coupled to the connection interface unit and the rewritable non-volatile memory module,
   wherein the memory control circuit unit is used to:
      receive at least one write command from the host system, wherein the at least one write command instructs to store target data;
      encode the target data to generate parity data;
      send a first write command sequence, wherein the first write command sequence instructs to store the target data in a first physical management unit, and the first physical management unit crosses the chip enabled regions; and
      send a second write command sequence, wherein the second write command sequence instructs to store the parity data in a second physical management unit, the second physical management unit crosses the chip enabled regions, and the first physical management unit is different from the second physical management unit, wherein
   the target data comprises first data, the parity data comprises first parity data, and the first parity data is used to protect the first data,
   the first parity data is generated based on encoding of the first data sequentially stored in a default number of the chip enabled regions, the first data and the first parity data can fulfill one physical management unit crossing the chip enabled regions,
   the first physical management unit storing the first data in a plurality of first chip enabled regions among the chip enabled regions, and the second physical management unit storing the first parity data in a second chip enabled region among the chip enabled regions different from the first chip enabled regions do not belong to any of one single physical management unit, continuous physical management units, and neighboring physical management units.

9. The memory storage device according to claim 8, wherein the operation of encoding the target data to generate the parity data by the memory control circuit unit comprises:
encoding the first data to generate the first parity data.

10. The memory storage device according to claim 8, wherein the target data further comprises second data, the parity data further comprises second parity data, and the second parity data is used to protect the second data,
in the first physical management unit, at least part of the second data is stored in the second chip enabled region, and
in the second physical management unit, the second parity data is stored in the first chip enabled region.

11. The memory storage device according to claim 10, wherein the operation of encoding the target data to generate the parity data by the memory control circuit unit comprises:
encoding the first data to generate the first parity data; and
encoding the second data to generate the second parity data.

12. The memory storage device according to claim 8, wherein in the second physical management unit, parity data for protecting different data is dispersedly stored in the chip enabled regions.

13. The memory storage device according to claim 8, wherein the memory control circuit unit is further used to:
respectively access the chip enabled regions via a plurality of channels.

14. The memory storage device according to claim 13, wherein in the second physical management unit, parity data for protecting different data is dispersedly stored in a plurality of chip enabled regions respectively corresponding to different channels.

15. A memory control circuit unit for controlling a rewritable non-volatile memory module, wherein the rewritable non-volatile memory module comprises a plurality of chip enabled regions, the memory control circuit unit comprising:
a host interface, used to couple to a host system;
a memory interface, used to couple to the rewritable non-volatile memory module;
an error detecting and correcting circuit; and
a memory management circuit, coupled to the host interface, the memory interface, and the error detecting and correcting circuit,
wherein the memory management circuit is used to:
receive at least one write command from the host system, wherein the at least one write command instructs to store target data;
instruct the error detecting and correcting circuit to encode the target data to generate parity data;
send a first write command sequence, wherein the first write command sequence instructs to store the target data in a first physical management unit, and the first physical management unit crosses the chip enabled regions; and
send a second write command sequence, wherein the second write command sequence instructs to store the parity data in a second physical management unit, the second physical management unit crosses the chip enabled regions, and the first physical management unit is different from the second physical management unit, wherein
the target data comprises first data, the parity data comprises first parity data, and the first parity data is used to protect the first data,
the first parity data is generated based on encoding of the first data sequentially stored in a default number of the chip enabled regions, the first data and the first parity data can fulfill one physical management unit crossing the chip enabled regions,
the first physical management unit storing the first data in a plurality of first chip enabled regions among the chip enabled regions, and the second physical management unit storing the first parity data in a second chip enabled region among the chip enabled regions different from the first chip enabled regions do not belong to any of one single physical management unit, continuous physical management units, and neighboring physical management units.

16. The memory control circuit unit according to claim 15, wherein the operation of encoding the target data to generate the parity data by the error detecting and correcting circuit comprises:
encoding the first data to generate the first parity data.

17. The memory control circuit unit according to claim 15, wherein the target data further comprises second data, the parity data further comprises second parity data, and the second parity data is used to protect the second data,
in the first physical management unit, at least part of the second data is stored in the second chip enabled region, and
in the second physical management unit, the second parity data is stored in the first chip enabled region.

18. The memory control circuit unit according to claim 17, wherein the operation of encoding the target data to generate the parity data by the error detecting and correcting circuit comprises:
encoding the first data to generate the first parity data; and
encoding the second data to generate the second parity data.

19. The memory control circuit unit according to claim 15, wherein in the second physical management unit, parity data for protecting different data is dispersedly stored in the chip enabled regions.

20. The memory control circuit unit according to claim 15, wherein the memory management circuit is further used to:
respectively access the chip enabled regions via a plurality of channels.

21. The memory control circuit unit according to claim 20, wherein in the second physical management unit, parity data for protecting different data is dispersedly stored in a plurality of chip enabled regions respectively corresponding to different channels.

\* \* \* \* \*